(12) United States Patent
Han

(10) Patent No.: US 9,342,788 B2
(45) Date of Patent: May 17, 2016

(54) POLYNOMIAL METHOD OF CONSTRUCTING A NON-DETERMINISTIC (NP) TURING MACHINE

(71) Applicant: Sherwin Han, Portsmouth, RI (US)

(72) Inventor: Sherwin Han, Portsmouth, RI (US)

(*) Notice: Subject to any disclaimer, the term of this patent is extended or adjusted under 35 U.S.C. 154(b) by 0 days.

(21) Appl. No.: 14/858,427

(22) Filed: Sep. 18, 2015

(65) Prior Publication Data

US 2016/0012339 A1 Jan. 14, 2016

Related U.S. Application Data

(63) Continuation of application No. PCT/US2014/032965, filed on Apr. 4, 2014.

(60) Provisional application No. 61/808,446, filed on Apr. 4, 2013.

(51) Int. Cl.
*G06N 5/04* (2006.01)
*G06N 5/00* (2006.01)
*G06N 5/02* (2006.01)

(52) U.S. Cl.
CPC .. *G06N 5/04* (2013.01); *G06N 5/00* (2013.01); *G06N 5/022* (2013.01)

(58) Field of Classification Search
CPC ....................................................... G06N 5/041
USPC ............................................................ 706/46
See application file for complete search history.

(56) References Cited

U.S. PATENT DOCUMENTS

| 6,038,392 | A | 3/2000 | Ashar |
| 6,247,164 | B1 | 6/2001 | Ashar |
| 6,611,841 | B1 | 8/2003 | Han |
| 6,728,728 | B2 | 4/2004 | Spiegler |
| 7,120,569 | B2 | 10/2006 | Arroyo-Figueroa |
| 7,194,710 | B2 | 3/2007 | Prasad |
| 7,418,369 | B2 | 8/2008 | Moskewicz |
| 7,543,266 | B2 | 6/2009 | Brown, Jr. |
| 7,565,634 | B1 | 7/2009 | Boyd |
| 9,031,890 | B2 | 5/2015 | Han |
| 2005/0182273 | A1 | 8/2005 | Eh |
| 2005/0182773 | A1 | 8/2005 | Feinsmith |
| 2009/0192963 | A1 | 7/2009 | Sankaranarayanan |
| 2009/0319461 | A1 | 12/2009 | Meek |

(Continued)

FOREIGN PATENT DOCUMENTS

| WO | 2014152541 A1 | 9/2014 |
| WO | 2014165752 A1 | 10/2014 |

OTHER PUBLICATIONS

Sherwin Han ("Hierarchical Dual Memory Structure Determines Cognitive Logic of the Human Brain" 2008.*

(Continued)

*Primary Examiner* — Lut Wong

(74) *Attorney, Agent, or Firm* — Robert Plotkin, P.C.; Robert Plotkin

(57) ABSTRACT

A nondeterministic Turing machine (NTM) performs computations using a spatial binary enumeration system, a three-dimensional relation system, a simulated-human logic system, and a bijective-set memory system. The NTM may be used to perform a variety of computational tasks, such as multiple sequence alignment, factorization, and other nondeterministic polynomial algorithms in polynomial time. The NTM may be constructed by a deterministic Turing machine (DTM) using the four systems listed above.

12 Claims, 7 Drawing Sheets

(56) References Cited

U.S. PATENT DOCUMENTS

| | | |
|---|---|---|
| 2011/0010412 A1 | 1/2011 | Macready |
| 2013/0179378 A1* | 7/2013 | Han .................. G06N 5/02 706/46 |
| 2014/0207839 A1 | 7/2014 | Han |
| 2014/0289181 A1 | 9/2014 | Han |
| 2015/0074024 A1 | 3/2015 | Han |

OTHER PUBLICATIONS

Wen et al ("3-SAT Polynomial Solution of Knowledge Recognition Algorithm" 2010).*

Cook, S., "The P versus NP Problem." Manuscript prepared for the Clay Mathematics Institute for the Millennium Prize Problems. (Apr. 2000) 12 pp. Available from the Clay Mathematics Institute.

Karp, R., "Reducibility Among Combinatorial Problems." in R. E. Miller and J. W. Thatcher (editors). Complexity of Computer Computations. New York: Plenum. pp. 85-103. (1972).

Wen, H., "Knowledge Recognition Algorithm enables P=NP," arXiv:1009.0884, Submitted to Cornell University Library, Sep. 2010, pp. 1-3.

Zhang, L., Madigan, C. F., Moskewicz, M. W., Andmalik, S. 2001. "Efficient conflict driven learning in a Boolean satisfiability solver." In Proceedings of the International Conference on Computer-Aided Design (ICCAD 2001). 279-285.

Zhou, Jiayu. et al., "Unified Hierarchical Iterate Model of Human Conceptualization and Cognition," In Proceedings of 8th IEEE International Conference on Cognitive Informatics (ICCI 2009), pp, 44-51, Jun. 14-17, 2009.

"A Probabilistic 3-SAT Algorithm Further Improved" ; Thomas Hofmeister, Uwe Schoning, Rainer Schuier, Osamu Watanabe. Dept. of Mathematical and Computing Sciences, Tokyo Institute of Technology, Meguro-ku Ookayama, Tokyo 152-8552, Japan. H. Alt and A. Ferreira (Eds.); STACS 2002, LNCS 2285, pp. 192-202, 2002. Springer-Verlag Berlin Heidelberg 2002.

* cited by examiner

| DECIMAL | ... | -9 | -8 | -7 | -6 | -5 | -4 | -3 | -2 | -1 |
|---|---|---|---|---|---|---|---|---|---|---|
| SPATIAL | ... | -1+1+1-1 | -1+1+1 | -1-1 | -1-1+1 | -1+1-1 | -1+1+1 | -1-1 | -1+1 | -1 |

| 0 | 1 | 2 | 3 | 4 | 5 | 6 | 7 | 8 | 9 | ... |
|---|---|---|---|---|---|---|---|---|---|---|
| 0 | +1 | +1-1 | +1+1 | +1-1-1 | +1-1+1 | +1+1-1 | +1+1+1 | +1-1-1-1 | +1-1-1+1 | ... |

FIG. 2

POLYNOMIAL METHOD OF CONSTRUCTING A NON-DETERMINISTIC (NP) TURING MACHINE

BACKGROUND

The term "Turing machine" refers to a theoretical computing device that performs computations in a manner first postulated by Alan Turing. Most modern electrical computers are instantiations of Turing machines. In general, a Turing machine may be understood as a device that has the ability to read symbols stored on, and to write symbols onto, an endless tape. The tape may be initialized to contain one or more symbols. Furthermore, the Turing machine has a "state" which may change over time. Often such states are described using simple labels, such as numbers (e.g., states 1, 2, and 3) or letters (e.g., states A, B, and C), but the particular labels that are used to identify states is not important.

The Turing machine includes a read/write head which, at any particular time, is positioned over a particular position on the tape, referred to as the "current position." The Turing machine reads the symbol currently stored at the current position on the tape (referred to herein as the "current input") and, based on that symbol and the Turing machine's current state, determines what action to perform next. Such actions include writing a specified symbol at the current position on the tape, the direction in which to move the head (forward or backward), and modifying the state of the Turing machine. The Turing machine may be associated with rules which specify the action(s) to take when the Turing machine reads a particular symbol while the Turing machine is in a particular state. Each such rule may specify any one or more of the types of actions just described. Examples of such rules include: "If symbol 1 is read while in state A, then write the symbol 2 at the current position and move one position forward," "If symbol 2 is read while in state A, then transition to state B," and "If symbol 1 is read while in state B, then write the symbol 3 at the current position, transition to state A, and move one position backward."

After performing the action(s) specified by a rule that is applicable to the current state and the current input, the Turing machine again reads the symbol currently stored at the current position on the tape, and the process above repeats.

The set of rules associated with a particular Turing machine may themselves be encoded in symbols on the Turing machine's tape. In this case, the Turing machine may read the rule-containing symbols and then effectively apply the rules embodied in those symbols to the subsequent symbols on the tape. A Turing machine which is able to apply encoded rules in this way is referred to as a "universal Turing machine" because it may be made to mimic any other specific Turing machine by providing it with the correct set of rule-encoding symbols. The set of rule-encoding symbols is also referred to as a computer program.

A Turing machine may be deterministic or non-deterministic. In a deterministic Turing machine, the set of rules that is associated with the Turing machine unambiguously specify the action(s) to be performed for each state-input combination. For example, a deterministic Turing machine specifies may specify the following: "If symbol 2 is read while in state A, then transition to state B," and specify no other action to be taken if symbol 2 is read while in state A. In contrast, the rules associated with a non-deterministic Turing machine (NTM) may specify two or more alternate actions to be performed for a state-input combination. For example, a NTM may specify both of the following rules: "If symbol 2 is read while in state A, then transition to state B" and "If symbol 2 is read while in state A, then transition to state C."

As the description above implies, in a deterministic Turing machine, the combination of the current state and current input uniquely (i.e., unambiguously) specify the symbol (if any) to be written at the current position, the direction (if any) to move the head, and the new state of the Turing machine (which may be the same as the current state). As the description above further implies, in a nondeterministic Turing machine, the combination of the current state and current input do not necessarily uniquely specify the symbol (if any) to be written at the current position, the direction (if any) to move the head, and the new state of the Turing machine (which may be the same as the current state). A nondeterministic Turing machine is nondeterministic, therefore, because the combination of the current state and the current input do not necessarily determine the symbol to be written by the Turing machine at the current position, the Turing machine's next state, and the Turing machine's next position.

A non-deterministic Turing machine may be thought of as a knowledge reasoning machine which works in a manner that is similar to the human brain. In each situation, a non-deterministic Turing machine may make many choices in parallel to move towards the solution of a problem. In contrast, a deterministic Turing machine is a transition function machine; that is, in any given situation, a deterministic Turing machine makes exactly one choice, and does not have the ability to pursue other choices in parallel. Therefore, the most significant difference between a deterministic Turing machine and a non-deterministic Turing machine is that the former cannot perform processing in parallel, while the latter can perform processing in parallel.

There is no known method for constructing an implementation of a non-deterministic Turing machine. Furthermore, it is not known whether a nondeterministic Turing machine can be constructed from a deterministic Turing machine. If a nondeterministic Turing machine could be constructed from a deterministic Turing machine, then it would be possible to solve problems in computing with significantly greater efficiency than is now possible.

SUMMARY

A nondeterministic Turing machine (NTM) performs computations using a spatial binary enumeration system, a three-dimensional relation system, a simulated-human logic system, and a bijective-set memory system. The NTM may be used to perform a variety of computational tasks, such as multiple sequence alignment, factorization, and natural language queries in polynomial time. The NTM may construct the NTM from a deterministic Turing machine (DTM) using the four systems listed above.

One embodiment of the present invention is a device comprising: a knowledgebase containing data representing a plurality of objects, data representing a plurality of classes, and data representing relationships between the plurality of objects and the plurality of classes; an induction module comprising means for generating data representing a concept represented by a plurality of inputs representing a plurality of objects and for storing the data representing the concept in the knowledgebase; a deduction module for retrieving, from the knowledgebase, data representing a class containing an object represented by an input to the deduction module; a reduction module for retrieving, from the knowledgebase, data representing an object which is a member of a class represented by an input to the reduction module; wherein the data representing the plurality of objects represent the plurality of objects in the form of three-dimensional representations of binary numbers; and wherein the data representing the plurality of classes represent the plurality of classes in the form of three-dimensional representations of binary numbers.

The deduction module may include means for retrieving the data representing the class by performing a set operation on data in the knowledgebase. The reduction module may include means for retrieving the data representing the object by performing a set operation on data in the knowledgebase.

The device may further include a cognitive logic unit comprising means for receiving an input and for triggering the induction module to perform induction on the input and on data stored in the knowledgebase to generate a representation of a class containing an object represented by the input.

The device may further include a cognitive logic unit comprising means for receiving an input and for triggering the deduction module to perform deduction on the input and on data stored in the knowledgebase to retrieve, from the knowledgebase, data representing a class containing an object represented by the input.

The device may further include a cognitive logic unit comprising means for receiving an input and for triggering the reduction module to perform deduction on the input and on data stored in the knowledgebase to retrieve, from the knowledgebase, data representing an object which is a member of a class represented by the input.

Another embodiment of the present invention is a method for use with a system including a knowledgebase, wherein the knowledgebase contains data representing a plurality of objects, data representing a plurality of classes, and data representing relationships between the plurality of objects and the plurality of classes. The method includes: generating data representing a concept represented by a plurality of inputs representing a plurality of objects and for storing the data representing the concept in the knowledgebase; retrieving, from the knowledgebase, data representing a class containing an object represented by an input to the deduction module; retrieving, from the knowledgebase, data representing an object which is a member of a class represented by an input to the reduction module; wherein the data representing the plurality of objects represent the plurality of objects in the form of three-dimensional representations of binary numbers; and wherein the data representing the plurality of classes represent the plurality of classes in the form of three-dimensional representations of binary numbers.

Retrieving the data representing the class may include performing a set operation on data in the knowledgebase. Retrieving the data representing the object may include performing a set operation on data in the knowledgebase.

The method may further include receiving an input and for triggering the induction module to perform induction on the input and on data stored in the knowledgebase to generate a representation of a class containing an object represented by the input.

The method may further include receiving an input and for triggering the deduction module to perform deduction on the input and on data stored in the knowledgebase to retrieve, from the knowledgebase, data representing a class containing an object represented by the input.

The method may further include receiving an input and for triggering the reduction module to perform deduction on the input and on data stored in the knowledgebase to retrieve, from the knowledgebase, data representing an object which is a member of a class represented by the input.

Other features and advantages of various aspects and embodiments of the present invention will become apparent from the following description and from the claims.

BRIEF DESCRIPTION OF THE DRAWINGS

FIG. 2 is an illustration of numbers represented in the Arabic number system and in the spatial binary number system of embodiments of the present invention;

DETAILED DESCRIPTION

In general, nondeterministic Turing machines (NTMs) implemented according to embodiments of the present invention include four subsystems: (1) a spatial binary enumeration system; (2) a 3-dimensional relation system; (3) a simulated human logic system; and (4) a bijective-set memory system.

Figure 1:
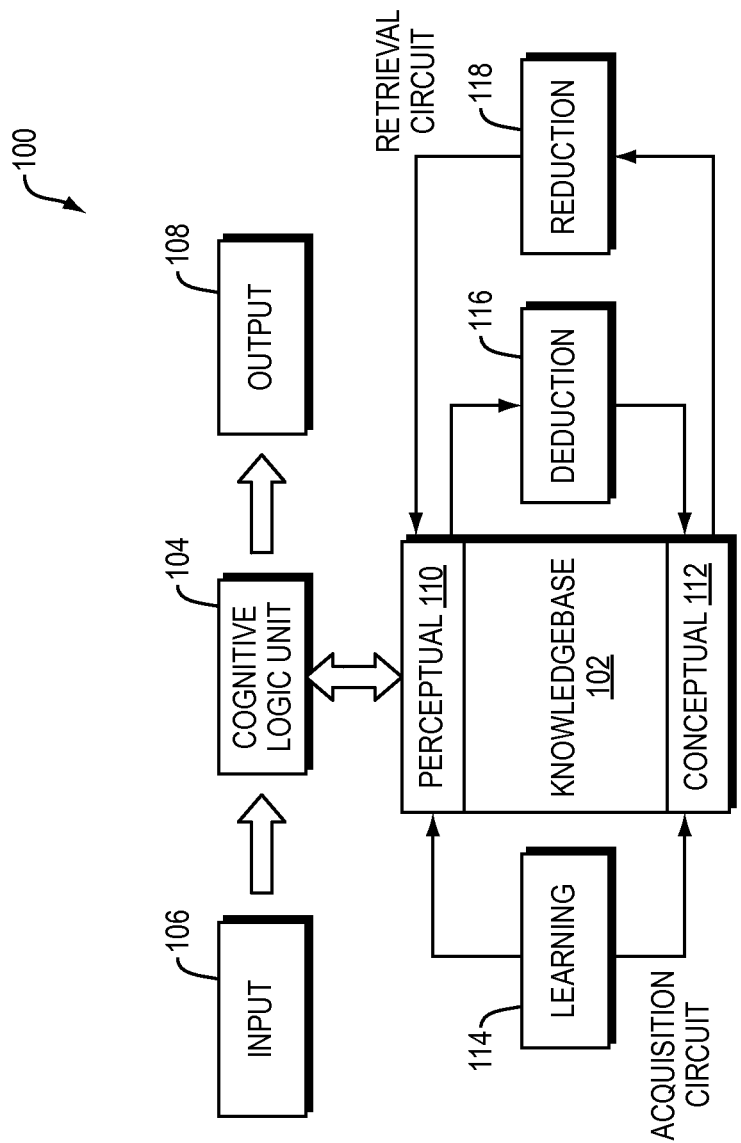
FIG. 1 is a diagram of a nondeterministic Turing machine according to one embodiment of the present invention.

For example, referring to FIG. 1, a diagram is shown of a nondeterministic Turing machine (NTM) 100 according to one embodiment of the present invention. The NTM 100 includes a memory 102, referred to herein as a "bijective set" memory, because it contains data representing bidirectional relationships, as will be described in more detail below. The memory 102 is also referred to herein as a "knowledgebase," as that term is used in U.S. Pat. No. 6,611,841. The NTM 100 also includes a simulated human logic system, which is also referred to herein as a cognitive logic unit 104 or a parallel information processor. The cognitive logic unit 104 does not work in the same way as a conventional central processing unit (CPU). Rather, the cognitive logic unit 104 works as a "set operator," which causes the entire NTM 100 to work as a set operator. The cognitive logic unit 104 reads input 106 and, based on the input and the contents of the memory 102, produces output 108. For example, and as will be described in more detail below, the cognitive logic unit 104 may perform one or more set operations on its input 106 (e.g., deductively and/or reductively) to produce its output 108, which represents the result of performing the set operation(s) on the input 106. Since the NTM 100 is nondeterministic, the bijective set memory 102 may contain data representing relationships among data in the sense described above in the Background section. The entire NTM 100, however, may be implemented using a deterministic Turing machine (DTM). In such embodiments, the NTM 100 uses a DTM to perform the functions of an NTM. The NTM 100 may, therefore, use a DTM to construct an NTM.

Examples of the bijective set memory 102, and of techniques for storing data in the bijective set memory, are described in more detail in U.S. Pat. No. 6,611,841, entitled, "Knowledge Acquisition and Retrieval Apparatus and Method," issued on Aug. 26, 2003; U.S. Prov. Pat. App. No. 61/798,848, entitled, "Sequence Alignment," filed on Mar. 15, 2013; and PCT App. No. PCT/US2014/027455, entitled, "Spatial Arithmetic Method of Sequence Alignment," filed on Mar. 14, 2014, all of which are hereby incorporated by reference herein.

A very brief summary of the bijective set memory 102 will be provided here. Further details are available in the above-referenced documents. In general, the bijective set memory 102 is based on an understanding of, and operates in a manner that is analogous to, the operation of the human brain. In particular, the bijective set memory 102 may contain two memories: a perceptual memory 110 and a conceptual memory 112. The perceptual memory 110 stores data representing perceptions, such as perceptions of objects. The conceptual memory 112 stores data representing conceptions (also referred to herein as concepts and classes). The conceptions represented by data stored in the conceptual memory 112 may be considered to be sets, while the perceptions represented by data stored in the perceptual memory 110 may be considered to be elements of the sets represented by the data stored in the conceptual memory 112.

The NTM 100 includes an induction module 114 (also referred to herein as a learning module or a concept formation module), which learns natural relationships between perceptions represented by data stored in the perceptual memory 110 and concepts represented by data stored in the conceptual memory 112, using a process of induction. For each relationship that the learning module 114 learns between a perception in the perceptual memory 110 and a corresponding concept in the conceptual memory 112, the learning module 114 generates and stores a two-way mapping between the data representing the perception in the perceptual memory 110 and the data representing the corresponding concept in the conceptual memory 112. The process performed by the learning module 114 of generating and storing such mappings for an increasingly large number of perceptions and corresponding concepts models the learning process performed by the human brain. The resulting set of mappings is an example of a "knowledgebase" as that term is used herein, and as that term is used in U.S. Pat. No. 6,611,841.

Once the learning module 114 has developed a knowledgebase containing two-way mappings between the perceptions represented by data stored in the perceptual memory 110 and the concepts represented by data stored in the conceptual memory 112, knowledge stored in the knowledgebase may be retrieved in any of a variety of ways. For example, the NTM 100 includes a deduction module 116 which may retrieve knowledge from the knowledgebase using deduction. In particular, if data representing a perception in the perceptual memory 110 is provided as input to the deduction module 116, then the deduction module 116 may follow the mapping (s) (i.e., relationships) from the perception in the perceptual memory 110 to the corresponding concept(s) in the conceptual memory 112, and thereby retrieve the concept(s) that correspond to the perception.

As another example, the NTM includes a reduction module 118 which may retrieve knowledge from the knowledgebase using reduction. In particular, if data representing a class (also referred to herein as a concept, conception, or set) in the conceptual memory 112 is provided as input to the reduction module 118, then the reduction module 118 may follow the mapping(s) from the concept in the conceptual memory 112 to the corresponding perception(s) in the perceptual memory 110, and thereby retrieve the perception(s) that correspond to the concept.

As mentioned above, NTMs implemented according to embodiments of the present invention include a spatial binary enumeration system, which refers to an enumeration system which enumerates numbers based on a set consisting of two fundamental (primitive) elements, which may be conceived of as representing +1 and −1.

Therefore, although the conventional binary number system also is based on two fundamental (primitive) elements, namely 0 and 1, the spatial binary enumeration system disclosed herein has a variety of advantages over the conventional binary number system that is based on 0 and 1. In particular, the spatial binary enumeration system disclosed herein is based on primitive elements having values that are equal in magnitude and opposite (i.e., complementary) in direction to each other, such as −1 and +1. In contrast, the primitive values of 0 and 1 in the conventional binary number system are not equal and opposite to each other. The spatial binary enumeration system's use of primitive values that are equal in value but opposite in direction to each other enables computations to be performed more efficiently than using the conventional binary number system.

As will be described in more detail below, the use of +1 and −1 as primitive values enables numbers represented as combinations of +1 and −1 to be represented as three-dimensional points in a three-dimensional space more easily and directly than numbers represented as combinations of +1 and 0. This further facilitates use of such numbers to perform arithmetic (such as multiplication, division, addition, or subtraction), factorization, and other arithmetic and logical operations more easily than conventional binary numbers composed of primitive values of 0 and 1.

Because the use of +1 and −1 to represent numbers is new, there is no existing terminology to refer to a number which has permissible values consisting of the set {+1, −1}. The existing term "bit" refers to a number which has a range of permissible values consisting of the set {+1, 0}. For ease of explanation, and because embodiments of the present invention may use either a representation based on {+1, 0} or {+1, −1}, the term "bit" will be used herein to refer both to numbers that have a range of permissible values consisting of the set {+1, 0} and to numbers that have a range of permissible values consisting of the set {+1, −1}. Similarly, the term "binary number" will be used herein to refer to any number consisting of bits, whether such bits have a range of {+1, 0} or {+1, −1}. For example, both the number 10011010 and the number +1−1−1+1+1−1+1−1 will be referred to herein as "binary numbers," even though the number +1−1−+1−1−1+1+1−1+1−1 does not contain "bits" in the conventional sense. The term "spatial binary number" will be used to refer specifically to numbers containing bits having a range of {+1, −1} when it is desired to refer to such numbers specifically.

Referring to FIG. 2, an illustration is shown of the use of the spatial binary enumeration system, as implemented according to an embodiment of the present invention, to enumerate the numbers −9 through +9. In this illustration, a spatial binary number whose leftmost bit is −1 is a negative number, while a spatial binary number whose leftmost bit is +1 is a positive number.

Furthermore, each positive spatial binary number may be read in a manner similar to a conventional binary number, but in which each +1 is equivalent to a binary 1 and in which each −1 is equivalent to a binary 0. For example, as shown in FIG. 2, the spatial binary number +1−1+1 is a positive number, because its leftmost bit is +1. Therefore, the spatial binary number +1−1+1 may be read in the same manner as binary 101, which is equal to Arabic 5. Any other spatial binary number may be represented similarly.

Furthermore, each negative spatial binary number may be read in a manner similar to a conventional binary number, but in which each −1 is equivalent to a binary 1, in which each +1 is equivalent to a binary 0, and in which the sign of the overall number is reversed. For example, as shown in FIG. 2, the spatial binary number −1+1−1 is a negative number, because its leftmost symbol is −1. Therefore, the spatial binary number −1+1−1 may be read in the same manner as binary 101, which is equal to Arabic 5, but with its sign reversed, so that it is equal to Arabic −5. Any other spatial binary number may be represented similarly.

As mentioned above, the spatial binary enumeration system disclosed herein may be used to perform computations with high efficiency. In particular, the spatial binary enumeration system enables computations to be performed by the nondeterministic Turing machine 100 (e.g., by the cognitive logic unit 104) in logarithmic time, rather than exponential time. Examples of such computations are provided, for example, in U.S. patent application Ser. No. 13/188,122, filed on Jul. 21, 2011, entitled, "Knowledge Reasoning Method of Boolean Satisfiability (SAT), and in U.S. patent application Ser. No. 14/191,384, filed on Feb. 26, 2014, entitled, "Spatial Arithmetic Method of Integer Factorization," both of which are hereby incorporated by reference herein.

As a particular example, addition and subtraction may be performed as follows. For example, in one embodiment of the present invention, addition of two primitive operands, labeled herein as (−1) and (+1) may be performed by the nondeterministic Turing machine 100 (e.g., by the cognitive logic unit 104) according to the following rules:

(−1)+(−1)=(−1)
(−1)+(+1)=(+1)
(+1)+(−1)=(+1)
(+1)+(+1)=(−1), carry (+1)

According to this scheme, any two numbers of any length (i.e., consisting of an ordered sequence of any number of primitive operands in any combination) may be added by the nondeterministic Turing machine 100 (e.g., by the cognitive logic unit 104) according to the rules listed above. Similarly, subtraction of the two primitive operands may be performed by the nondeterministic Turing machine 100 (e.g., by the cognitive logic unit 104) according to the following rules:

(−1)−(−1)=(−1)
(−1)−(+1)=(+1), borrow (+1)
(+1)−(−1)=(+1)
(−1)−(+1)=(−1)

According to this scheme, any two numbers of any length (i.e., consisting of an ordered sequence of any number of primitive operands in any combination) may be subtracted by the nondeterministic Turing machine 100 (e.g., by the cognitive logic unit 104) according to the rules listed above.

Alternatively, for example, the following rules may be used to perform addition:

(−1)+(−1)=(+1), carry (−1)
(−1)+(+1)=(−1)
(+1)+(−1)=(−1)
(+1)+(+1)=(+1)

In this case, the following rules may be used to perform subtraction:

(+1)−(+1)=(+1)
(+1)−(−1)=(−1), borrow (−1)
(−1)−(+1)=(−1)
(−1)−(−1)=(+1)

Whether the first set of addition/subtraction rules or the second set of addition/subtraction rules above are used by the nondeterministic Turing machine 100 (e.g., by the cognitive logic unit 104) to perform addition and subtraction, the spatial binary enumeration system of embodiments of the present invention provides a mechanism for performing both addition and subtraction using simple rules that enable both addition and subtraction to be performed using the same algorithm, without the need for a special algorithm for performing subtraction. This is merely one example of an advantage of embodiments of the present invention over conventional computing techniques.

As mentioned above, NTMs implemented according to embodiments of the present invention include a 3-dimensional relation system. Such a system is described in detail in U.S. patent application Ser. No. 14/191,384, filed on Feb. 26, 2014, entitled, "Spatial Binary Method of Integer Factorization," which is hereby incorporated by reference herein. Therefore, only a brief summary of the 3-dimensional relation system will be described herein.

For example, the NTM 100 may map the x, y, and z dimensions in a three-dimensional space to the powers of 2 (i.e., 0, 1, 2, 4, 8, 16, etc.) in a repeating pattern. More specifically, the NTM 100 may select an order for the x, y, and z dimensions. Such orders include the following: (1) x, y, z; (2) y, z, x; (3) z, x, y; (4) x, z, y; (5) z, y, x; and (6) y, x, z. Any of these orders may be chosen. Once such an order is chosen, the order may be repeated and the repeating sequence of dimensions may be mapped to the powers of 2.

Assume, for example, that the order x, y, z is selected. When the three dimensions in this order are repeated, they may form the following repeating pattern: x, y, z, x, y, z, x, y, z, and so on, infinitely.

Now consider any particular binary number A. The NTM 100 may produce or otherwise identify and store (e.g., in the memory 102) a three-dimensional representation of the binary number A by mapping the bits in the binary number A to the x, y, and z dimensions using a mapping such as the one described above, and then by producing a corresponding ordered set of three-dimensional relations. As an example, consider the spatial binary number +1−1−1+1+1−1+1−1, which may be mapped to the x, y, and z dimensions as follows: +1y−1x−1z+1y+1x−1z+1y−1x.

Note that, in this example, the bits of the binary number A have been mapped to the x, y, and z dimensions in the previously-selected order (e.g., x, y, z), starting with the rightmost bit of the binary number A, and proceeding to the left one bit at a time. For example, assume that the dimensions x, y, and z have been assigned the order x, y, z (in a repeating pattern). Therefore:

the first (rightmost) bit in the binary number A has been mapped to the first dimension in the selected order of dimensions (namely, the x dimension in this example);

the second bit in the binary number A has been mapped to the second dimension in the selected order of dimensions (namely, the y dimension in this example);

the third bit in the binary number A has been mapped to the third dimension in the selected order of dimensions (namely, the z dimension in this example);

the fourth bit in the binary number A has been mapped to the first dimension in the selected order of dimensions (namely, the x dimension in this example), based on the repeating pattern of the dimensions;

and so on.

The NTM 100 may use such a representation of a mapping between binary number A and the x, y, and z dimensions to create a three-dimensional representation of the binary number A in a three-dimensional space, and to store the representation of the binary number A in the knowledgebase 102. When creating such a three-dimensional representation of a binary number, for each bit in the number, the NTM 100 creates a representation of a corresponding point in three-dimensional space, and stores the representation of the corresponding point in the knowledgebase 102. When the NTM 100 creates a representation of a point in three-dimensional space corresponding to a particular bit, both the dimension to which that bit is mapped and the bit position of that bit are used to create the representation of the point. Therefore, to aid in the understanding of how the mapping of a binary number to dimensions is used to create a three-dimensional representation of the number, we will further refine the textual representation of the mapping by including a subscript after each dimension to represent the bit position that corresponds to the dimension. For example, we may insert such subscripts into the mapping +1y−1x−1z+1y+1x−1z+1y−1x to create a revised mapping of $+1y_8-1x_7-1z_6+1y_5+1x_4-1z_3+1y_2-1x_1$, in which each subscript represents the bit position of the corresponding bit.

In this representation, each bit in a binary number is represented by four symbols: (1) either a + or a −, representing the sign of the bit (positive or negative), which corresponds to the direction of the relation of the bit to the previous bit in three-dimensional space; (2) the number 1; (3) a symbol representing the dimension (x, y, or z) to which the bit is mapped in three-dimensional space; and (4) a subscript representing the position of the bit in the binary number. For example, the rightmost bit in the binary number above is represented by the four symbols $-1x_1$, indicating that the sign of the bit is negative, that the bit is mapped to the x dimension, and that the bit is at position one in the binary number.

As mentioned above, the three dimensions may be mapped to bit positions in any sequence (e.g., xyz, yzx, zxy). Once such a sequence is picked, such a sequence determines an order of the layers in the 3-dimensional model described above. Since any sequence of dimensions may be chosen, any particular number may be represented in any of three equivalent ways as points in three-dimensional space.

In 3-dimensional space, each dimension has a positive direction and a negative direction. These directions may be represented as follows:

+1x (x dimension, positive direction);
−1x (x dimension, negative direction);
+1y (y dimension, positive direction);
−1y (y dimension, negative direction);
+1z (z dimension, positive direction); and
−1y (z dimension, positive direction).

These may be combined together into 8 types of triplets, also referred to herein as "relation types":

−1z−1y−1x;
−1z−1y+1x;
−1z+1y−1x;
−1z+1y+1x;
+1z−1y−1x;
+1z−1y+1x;
+1z+1y−1x; and
+1z+1y+1x.

Figure 3A:
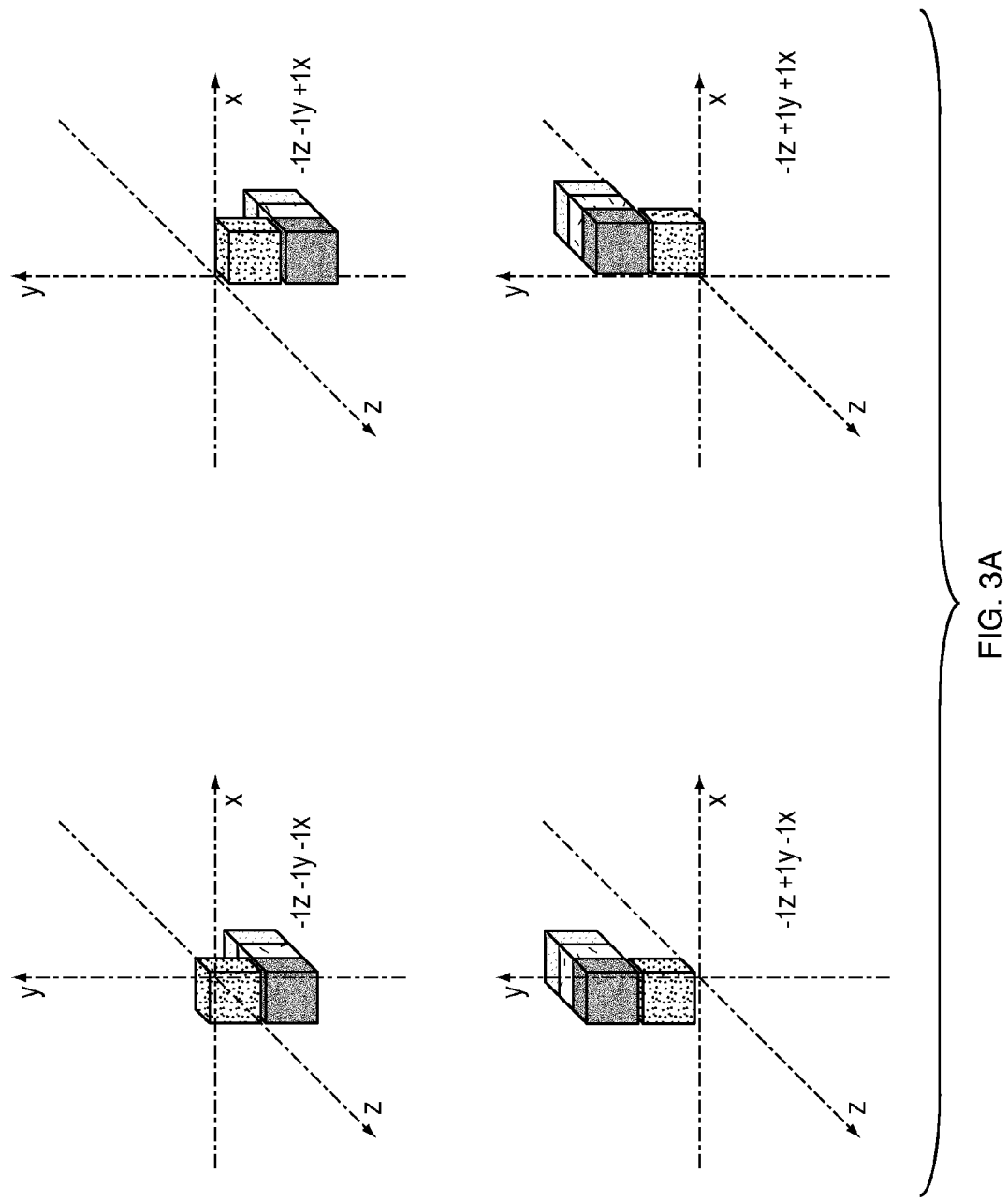
FIGS. 3A-3G are diagrams illustrating the 3-dimensional spatial binary enumeration system of embodiments of the present invention.
Figure 3B:
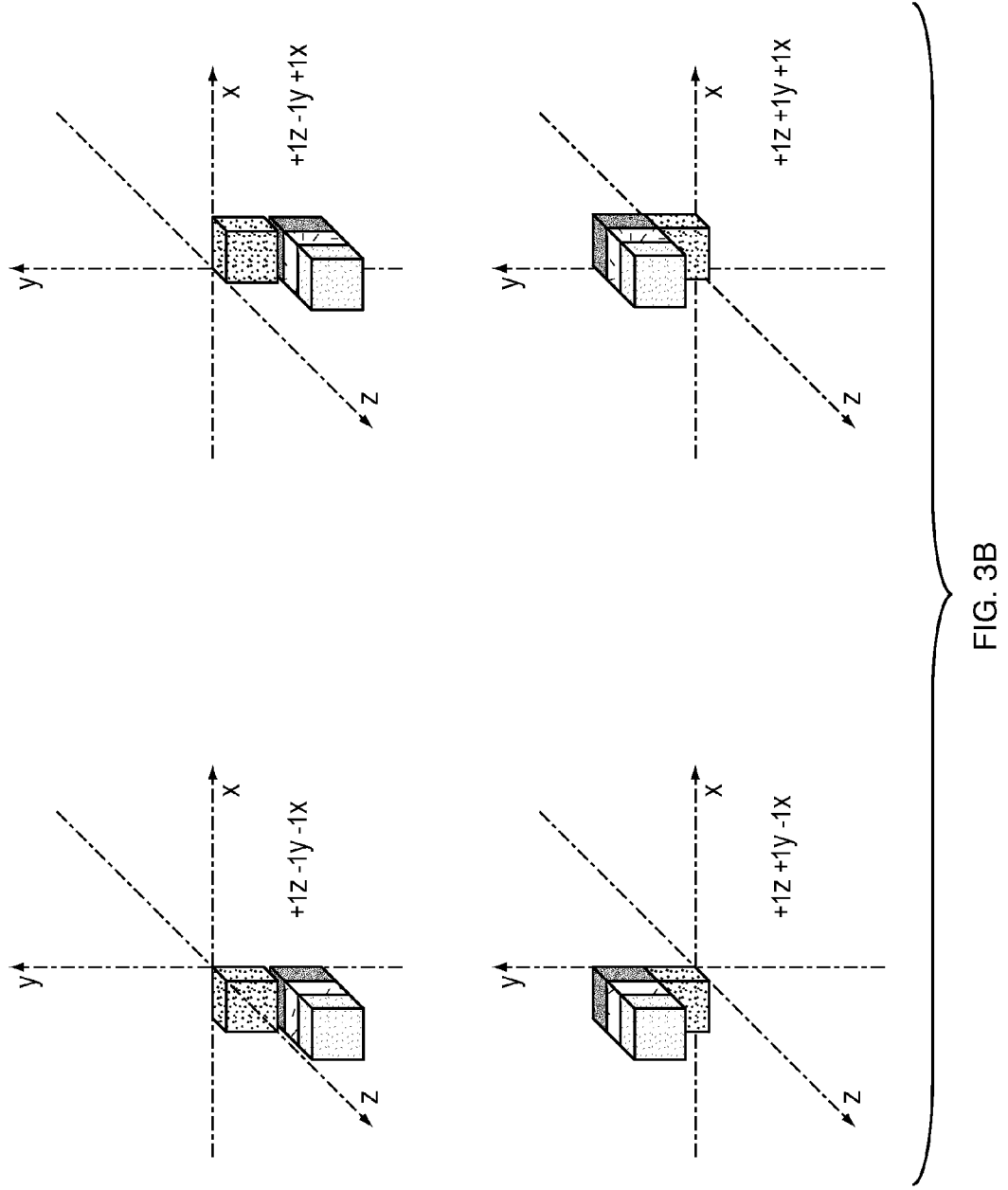

Graphical representations of these eight basic triplets are shown in FIGS. 3A-3B. Any two such triplets may be combined together in 64 possible ways. These 64 combinations represent the complete set of combinatorial types in a 3-dimensional space. Therefore, any information in 3-dimensional space may be presented using these 64 combinations of triplets.

Note that each colored cube in the triplets shown in FIGS. 3A-3B represents a bit in the corresponding binary number. For example, the three-dimensional representation shown in the upper left of FIG. 3A represents the decimal number −7, which is equal to the spatial binary number −1−1−1, which may be represented by the mapping $-1x_3-1y_2-1z_1$. In this example, in the representation in the upper left of FIG. 3A:

the colored cube located at coordinates x=−1, y=−1, z=−1 represents the bit $-1z_1$;
the colored cube located at coordinates x=−1, y=−2, z=−1 represents the bit $-1y_2$; and
the colored cube located at coordinates x=−3, y=−2, z=−1 represents the bit $-1x_3$.

Note also that each colored cube is connected to the next colored cube in the sequence by an edge consisting of zero or more non-colored cubes. For example, consider the successive bits $-1y_2$ and $-1x_3$ in the example illustrated in the upper left of FIG. 3A. Note that the colored cubes representing these bits are connected by a single non-colored cube. This connection is an edge representing a spatial relationship between the successive bits $-1y_2$ and $-1x_3$. In this way, the NTM 100 may create and store both: (1) three-dimensional representations of individual bits within binary numbers, and (2) representations of spatial relationships among bits within binary numbers.

Figure 3C:
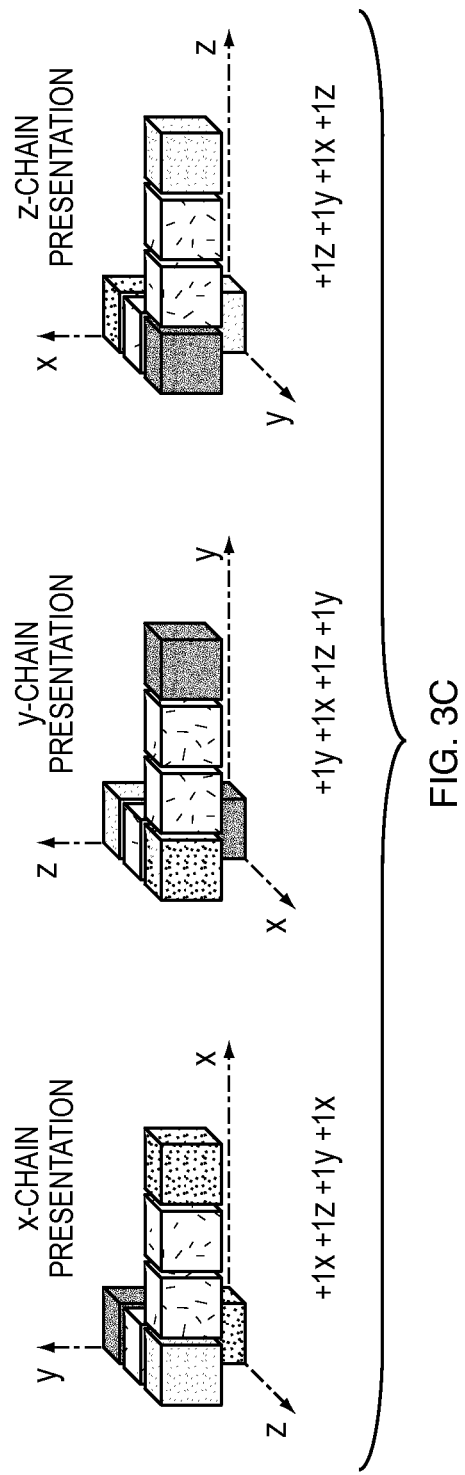

In summary, and as described in more detail in the above-referenced patent applications entitled, "Spatial Arithmetic Method of Integer Factorization" and "Spatial Arithmetic Method of Sequence Alignment," according to the 3-dimensional relation aspect of embodiments of the present invention:

Every number may be represented by a layered set of 3-dimensional relations.
Each layer indicates a corresponding bit position.
Each number is read from the outside layer to the inside layer.
All numbers of combinations of −1 and +1.
All numbers are ordered within three dimensions.
Each number has three equivalent representations. A graphical representation of the three equivalent representations of a particular number is shown in FIG. 3C.
Positive (+) and negative (−) are opposite directions.

In the 3-dimensional relation system of embodiments of the present invention, all numbers can be represented by combinations of triplets. Furthermore, the 3-dimensional enumeration of embodiments of the present invention reduces the complexity of computation. Yet furthermore, the 3-dimensional enumeration of embodiments of the present invention enables the proof that P=NP.

The enumeration of the decimal numbers −9 through −1 and 1 through 9 in FIG. 2 merely represents the numerical enumeration of such numbers (also referred to as their "ordinality"). Embodiments of the present invention may be used not only to perform such numerical enumeration, but also to enumerate numbers in a three-dimensional space (where such spatial enumeration is referred to as "cardinality"). In particular, embodiments of the present invention may be used to enumerate both the ordinality and cardinality of the positive integers (e.g., decimal numbers 1, 2, 3, etc.), the negative integers (e.g., decimal numbers −1, −2, −3, etc.), and any fractions thereof (e.g., ½, ¼, ⅛, etc.).

Figure 3D:
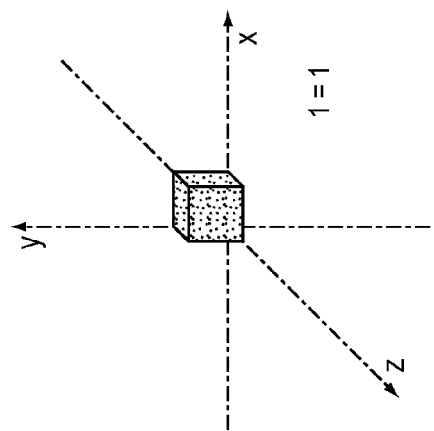
Figure 3E:
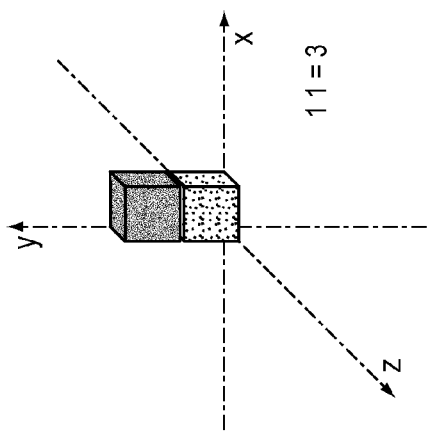
Figure 3F:
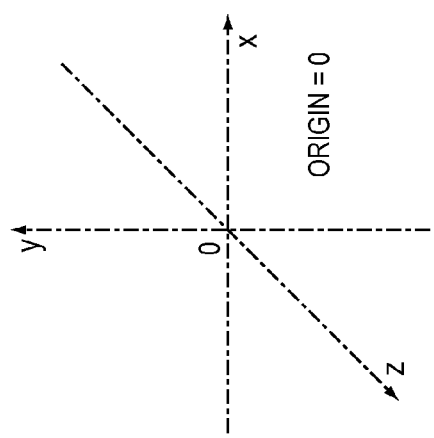

For example, FIGS. 3D, 3E, and 3F illustrate three-dimensional representations of the number 0 and the decimal numbers 1 (spatial binary +1), 2 (spatial binary +1−1), and 3 (spatial binary +1+1). First, consider the origin point at (0, 0, 0), illustrated in FIG. 1E. This point represents the number zero.

Now consider the decimal number 1, which is equal to the binary +1. To construct a three-dimensional representation of this number, assume that the order of the dimensions is x, y, z. The NTM 100 constructs a three-dimensional representation of the binary number +1, and stores the resulting three-dimensional representation in the knowledgebase 102, by reading each bit in the number and creating a point in three-dimensional space corresponding to that bit, to create a set of three-dimensional points corresponding to the number, and storing representations of those three-dimensional points in the knowledgebase 102. Because the binary number +1 only contains 1 bit, the corresponding representation of the binary number +1 in three-dimensional space consists of exactly one representation of one point in three-dimensional space, namely a single point corresponding to the bit +1.

More specifically, the NTM 100 reads the number to be represented in three-dimensional space one bit at a time, starting with the lowest bit on the right and moving toward the highest bit on the left in sequence to the next highest bit until the highest bit in the number is reached. The NTM 100 creates and stores in the knowledgebase 102, for each such bit, a representation of a corresponding point in three dimensional space.

Recall that the three dimensions are assigned a particular order. Assume for purposes of example that the dimensions are assigned an order of x, y, z. Therefore, in this example, NTM 100 associates the first (lowest) bit in a number with the x dimension, the NTM 100 associates the second (next-lowest) bit in the number with the y dimension, the NTM 100 associates the third (next-lowest) bit in any number with the z dimension, the NTM 100 associates the fourth (next-lowest) bit in any number with the x dimension, and so on. In other words, the NTM 100 assigns bits in the number to the x, y, and z dimensions in a repeating pattern (in whatever order has been assigned to the x, y, and z dimensions), starting with the lowest bit of the number and continuing bit-by-bit until the highest bit of the number is reached.

The NTM 100 associates each dimension with a corresponding number, starting with 1, and increasing incrementally, in a repeating pattern of dimensions. For example, if the dimensions are assigned the order x, y, z, then the number 1 may be associated with the x dimension 1, the number 2 may be associated with the dimension y, the number 3 may be associated with the dimension z, the number 4 may be assigned to the dimension x, and so on. As this example illustrates, each dimension may be associated with more than one number, depending on the corresponding bit position. Each bit position may be designated with a subscript after the corresponding dimension, such as $x_1$, $y_2$, $z_3$, $x_4$, $y_5$, $z_6$, etc. The assignment of bits in a binary number may be designated by writing each bit followed by its associated dimension. For example, the binary number +1−1+1+1+1−1 may be written as $+1x_1-1y_2+1z_3+1x_4+1y_5-1z_6$.

Techniques that may be used to represent binary numbers in three-dimensional space according to embodiments of the present invention will now be described. First consider the decimal number 1, which is equal to the binary number +1. The lowest bit of this number is assigned to the first dimension in the assigned order of dimensions. In this case, the lowest bit is equal to +1, and the first dimension is the x dimension. Therefore the value of +1 is assigned to the x dimension. As described above, this may be written as $+1x_1$.

The NTM 100 may create a representation of a point in three-dimensional space representing $+1x_1$ may to represent the first bit of the binary number +1. The NTM 100 may create a representation of a point in three-dimensional space representing $+1x_1$ (which may alternatively be written as x1) may be created by starting at the origin point and moving along the axis indicated by $+1x_1$ (namely, the x axis), in the direction indicated by $+1x_1$ (namely, in the positive direction), to the coordinate on the x axis indicated by the subscript of $+1x_1$ (namely, to the coordinate x=0). This results in the creation of a representation of a point at x1=1, y1=1, z1=1. This single point represents the binary number 1. Note that coordinates of x=0, y=0, and z=0 are only used to represent the number 0, namely by the origin at (0, 0, 0). No other number is represented by a point having any coordinate equal to zero.

Now consider the decimal number 2, which is equal to the conventional binary number 10 and to the spatial binary number +1−1. These two bits, starting with the lowest bit and moving bit-by-bit to the highest bit, may be assigned to the x and y dimensions, respectively. For example, the spatial binary number +1−1 may be assigned to the x and y dimensions to produce a mapping of the spatial binary number +1−1 to the representation $+1y_2-1x_1$.

Based on this assignment of bits to dimensions, and as shown in FIG. 3E, the spatial binary number +1−1 may be represented in three-dimensional space by a collection of points, each of which corresponds to a corresponding bit in the spatial binary number +1−1. In particular, because the spatial binary number +1−1 contains exactly two bits, the spatial binary number +1−1 is represented by exactly two points in three-dimensional space in FIG. 3E. More specifically, reading from the lowest bit to the highest bit:

the lowest bit in $+1y_2-1x_1$ (i.e., the rightmost bit, having a value of $-1x_1$), is represented by a point at x=−1, y=1, z=1;

the next-lowest bit in $+1y_2-1x_1$ (i.e., the leftmost bit, having a value of $+1y_2$), is represented by a point at x=−1, y=2, z=1, as the result of moving from the previous point (x=−1, y=1, z=1) in the positive direction on the y axis to the coordinate y=2.

The resulting three-dimensional representation of decimal 2 is, as shown in FIG. 3F, a set of exactly two points at coordinates (x=−1, y=1, z=1) and (x=−1, y=2, z=1). Note that in the case of a one-bit or two-bit number, the z coordinates (or more generally, the coordinates of the third dimension in the ordered sequence of dimensions) may be chosen arbitrarily because the z (third) coordinate is not necessary to represent the number.

Now consider the decimal number 3, which is equal to the conventional binary number 11 and to the spatial binary number +1+1. These two bits, starting with the lowest bit and moving bit-by-bit to the highest bit, may be assigned to the x, y, and z dimensions. As a result, the spatial binary number +1+1 may be assigned to the x, y, and z dimensions to produce $+1y_2+1x_1$.

Figure 3G:
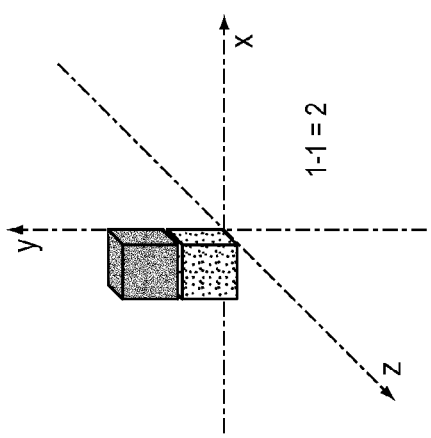

Based on this assignment of bits to dimensions, and as shown in FIG. 3G, the binary number +1+1 may be represented in three-dimensional space by a collection of points, each of which corresponds to a corresponding bit in the spatial binary number +1+1. In particular, because the spatial binary number +1+1 contains exactly two bits, the spatial binary number +1+1 is represented by exactly two points in three-dimensional space in FIG. 3G. More specifically, reading from the lowest bit to the highest bit:

the lowest bit in $+1y_2+1x_1$ (i.e., the rightmost bit, having a value of +10, is represented by a point at x=1, y=1, z=1;

the next-lowest bit in $+1y_2+1x_1$ (i.e., the leftmost bit, having a value of $+1y_2$), is represented by a point at x=1, y=2, z=1, as the result of moving from the previous point (x=1, y=1, z=1) in the positive direction on the y axis to the coordinate y=2.

The resulting three-dimensional representation of decimal 3 is, as shown in FIG. G, a set of exactly two points at coordinates (x=+1, y=1, z=1) and (x=1, y=2, z=1).

Those having ordinary skill in the art will appreciate how to represent enumerate and represent additional numbers, both positive and negative, in the three-dimensional space illustrates in FIGS. 3D-3G. As further mentioned above, NTMs according to embodiments of the present invention include a simulated human logic system in the form of the cognitive logic unit 104. The cognitive logic unit 104 is built on the recognition that there is a natural order to the three-dimensional relation system described herein and to knowledge more generally. For example, the human brain naturally sorts information in order to organize it. Similarly, nature automatically connects proteins to each other in certain orders and not others. Similarly, logic systems implemented in the cognitive logic unit 104 automatically organize information into relations within the bijective set memory 102.

As described above and as further described in U.S. Pat. No. 6,611,841, data representing perceptions, concepts, and relationships between the perceptions and concepts may be stored in the knowledgebase 102. Each such perception and concept may be represented by data in the knowledgebase 102 in the form of a spatial binary number having the form described herein. For example, a particular perception (object) may be represented in the knowledgebase 102 by data representing a three-dimensional representation of a spatial binary number of the kind described above. Similarly, a particular concept (class) may be represented in the knowledgebase 102 by data representing a three-dimensional representation of a spatial binary number of the kind described above. Relationships between spatial binary numbers in the knowledgebase 102 may represent relationships between the perceptions and/or concepts represented by those spatial binary numbers.

For example, consider the perceptions "George Washington" and "Abraham Lincoln." Each such perception may be represented in the knowledgebase 102 by a distinct spatial binary number. Similarly, consider the concepts "President" and "Politician." Each such concept may be represented in the knowledgebase 102 by a distinct spatial binary number. The relationships between such perceptions and concepts may be represented by relationships between the corresponding spatial binary numbers. For example, the fact that "George Washington" is a member of the class "President" may be represented in the knowledgebase 102 by a relationship between the spatial binary number representing the perception "George Washington" and the spatial binary number representing the concept "President."

The use of spatial binary numbers to represent perceptions and concepts in the knowledgebase 102 enables the knowledgebase 102 to store an index of all of the perceptions and concepts stored in the knowledgebase 102. Each spatial binary number in the knowledgebase 102 acts as an index into the knowledgebase 102. In other words, the content of each memory location in the knowledgebase 102 serves as its own address. As a result, if the NTM 100 is presented with a particular spatial binary number as the input 106 to the NTM 100, the cognitive logic unit 104 may use that spatial binary number as an index into the knowledgebase 102 to retrieve the relationships of that spatial binary number stored in the knowledgebase 102 in an amount of time that is a quadratic function of the length of the spatial binary number.

The cognitive logic unit 104 may perform a variety of functions, such as the induction, deduction, and reduction functions disclosed above in connection with the learning module 114 (which learns and stores relations), deduction module 116 (which maps element information to set information), and reduction module 118 (which maps set information to element information) in FIG. 1. For example, the cognitive logic unit 104 may receive input 106 (such as input received from a user of the NTM 100). In response to receiving the input 106, the cognitive logic unit 104 may control the learning module 114 to perform induction on the input 106 (and possibly on previous inputs received by the NTM 100 and/or on data already stored in the knowledgebase 102), and thereby to create and store new learned knowledge in the knowledgebase 102. The cognitive logic unit 104 may then produce output 108 based on the new learned knowledge, such as output representing a concept that the induction module 114 learned based on the input 106.

As another example, in response to receiving the input 106, the cognitive logic unit 104 may control the deduction module 116 to perform deduction on the input 106 (and possibly on previous inputs received by the NTM 100 and/or on data already stored in the knowledgebase 102), and thereby to extract existing data from the knowledgebase 102 representing one or more classes of which an object represented by the input 106 is a member. The cognitive logic unit 104 may then produce output 108 based on the result of the deduction, such as output representing a class which contains an object represented by the input 106.

As another example, in response to receiving the input 106, the cognitive logic unit 104 may control the reduction module 118 to perform reduction on the input 106 (and possibly on previous inputs received by the NTM 100 and/or on data already stored in the knowledgebase 102), and thereby to extract existing data from the knowledgebase 102 representing one or more objects which are members of a class represented by the input 106. The cognitive logic unit 104 may then produce output 108 based on the result of the reduction, such as output representing one or more objects which are members of a class represented by the input 106.

As these examples illustrate, the cognitive logic unit 104 may trigger one or more of the learning module 114, the deduction module 116, and the reduction module 118 to perform their respective functions on the input 106, and the cognitive logic unit 104 may produce output 108 based on the results of the functions performed by such modules. The cognitive logic unit 104 may, therefore, act as an interface between a user of the NTM 100 and the modules 114, 116, and 118. The cognitive logic unit 104 may, therefore, also act as a controller of the modules 114, 116, and 118. The cognitive logic module 104 may retrieve data (representing existing knowledge) from the knowledgebase 102 using the modules 114, 116, and 118. Furthermore, the cognitive logic module 104 may store data (representing new knowledge) in the knowledgebase 102 using the modules 114, 116, and 118.

Logic systems implemented in the cognitive logic unit 104 according to embodiments of the present invention perform a variety of functions and provide a variety of benefits. For example, such logic systems enable knowledge to be learned automatically in the manner disclosed herein. In natural language and natural numbers there exist natural relations and natural logic. Humans can perceive these hidden relations automatically, but current computers are not equipped to process these relations. The cognitive logic unit 104 provides the ability to recognize natural relations, such as natural relations expressed in natural languages and natural numbers. As another example, the cognitive logic unit 104 enables knowledge to be processed in parallel. As yet another example, the cognitive logic unit 104 eliminates most of the traditional task of "programming," by replacing programming with the process of learning and then of extracting learned knowledge. For example, the cognitive logic unit 104 may extract knowledge from the knowledgebase 102 without programming as follows. The NTM 100 of FIG. 1 may receive input 106, and then:

the cognitive logic unit 104 may apply deduction 116 to the input 106 to extract existing knowledge from the knowledgebase 102 representing one or more concepts associated in the knowledgebase 102 with the presented data; and/or the cognitive logic unit 104 may apply reduction 116 to the input 106 to extract existing knowledge from the knowledgebase 102 representing one or more objects (perceptions) associated in the knowledgebase 102 with the presented data.

In either case, no special programming need to be performed on the NTM 100 to enable concepts or perceptions to be extracted from the knowledgebase 102. Instead, the operations of deduction 116 and/or reduction 118 may be applied to the input 106 to extract concepts and perceptions without writing a separate program.

The cognitive logic unit 104 may perform set operations on output generated by the deduction module 116 and/or the reduction module 118. For example, the cognitive logic unit 104 may receive one or more outputs from either or both of the deduction module 116 and the reduction module 118, and then perform one or more set operations on such output. Examples of such set operations include intersection, union, difference, and complement operations. The cognitive logic unit 104 may then produce output representing the outcome of performing such a set operation or operations. As a simple example, consider the following:
- the reduction module 116 is provided with an input representing the class of mammals and performs reduction on that input to produce output representing one or more animals which are mammals, based on the relations stored in the knowledgebase 102;
- the reduction module is provided with an input representing the class of animals which live in the ocean and performs reduction on that input to produce output representing one or more animals which live in the ocean, based on the relations stored in the knowledgebase 102.

The cognitive logic unit 104 may receive, as inputs, both such outputs from the reduction module 118, and perform an intersection operation on such inputs to produce an output representing the set of mammals which live in the ocean (e.g., whales). Although only this simple example is used for purposes of explanation, the cognitive logic unit 104 may perform any type of set operation on any one or more outputs of the deduction module 116 and/or the reduction module 118.

Figure 4:
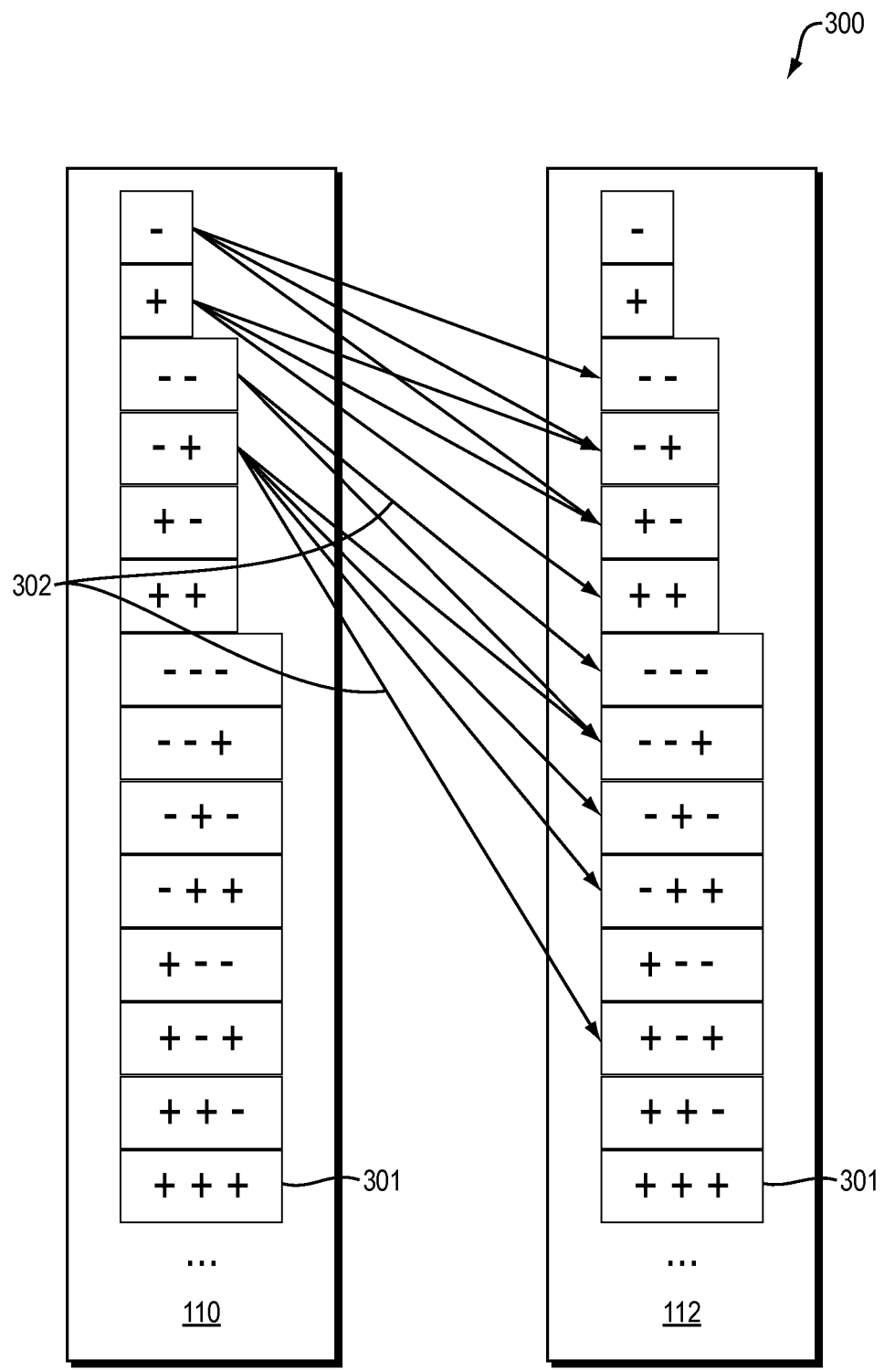
FIG. 4 is a diagram illustrating a bijective-set memory according to one embodiment of the present invention.

Referring to FIG. 4, a diagram is shown of a bijective-set memory 300 according to one embodiment of the present invention. The bijective-set memory 300 of FIG. 4 may be used to implement some or all of the knowledgebase 102 of FIG. 1. In the embodiment of FIG. 4, the bijective-set memory 300 includes two memories: memory 110 storing element information (also referred to as "object" information and "perception" information), and memory 112 storing set information (also referred to as "class" information, "concept" information, and "conceptual" information). Relations 301 indicate a 1 to 1 correlation between memories 110 and 112. This 1 to 1 correlation 301 indicates that the two memories 110 and 112 function like mirrors, although memory 110 is an object (element) memory and memory 112 is a class memory. Relations 302 indicate "belonging" relations, such as (− +) belongs to (− + +) and (+ − +). The bijective-set memory 300 is in an iterative structure, which contains elements that belong to sets. As a result, the data stored in the bijective-set memory 300 is also referred to as an iterative set. That is, the elements stored in the first level of the memory 300 are −1 and +1. These lowest-level (primitive) elements in the memory 300 are also referred to herein as "literals," "letters," or "characters." The elements stored in the second level of the memory 300 are combinations of two letters (e.g., (− +), (− −)), which are referred to herein as "words." Characters in the first level belong to specific words in the second level. The elements stored in the third level of the memory 300 are three-letter combinations, such as (− + −) and (+ + −), which are referred to herein as "clauses" or "triplets." Words in the second level belong to specific triplets in the third level. Elements stored at any level in the memory 300 above the third level may be represented as combinations of triplets. One of the advantages this method provides is a novel folded-graph data structure. This folded-graph data structure is able to process NP-problems as two-directional mappings instead of as a one-way function. Therefore, this method is able to solve NP-problem in polynomial time.

A second advantage is that this folded-graph data structure is able to cope with the natural logic that humans use, therefore, it is able to process natural language with the same logic and make the man-machine interaction natural.

A third advantage is its "natural order of storage". That is, all the input information is organized by its relations with triplets and sequences of the triplets. When information is retrieved, relations will be recognized in polynomial time without using an exhaustive search.

Embodiments of the present invention have a variety of advantages. In general, embodiments of the present invention may be used to construct a nondeterministic Turing machine (NTM) from a deterministic Turing machine (DTM). NTMs are capable of solving computational problems with significantly greater efficiency than DTMs. One reason for this is that DTMs suffer from the "von Neumann bottleneck" because they store both the program and data in the same memory, which has a single bus for communication with the central processing unit (CPU). The limited throughput of the bus connecting the CPU and memory, and the fact that program memory and data memory cannot be accessed simultaneously because both are combined into a single memory, inherently limits the speed at which the CPU can execute programs. NTMs implemented according to embodiments of the present invention do not have the von Neumann architecture and therefore do not suffer from the von Neumann bottleneck. Instead, embodiments of the present invention may perform operations in parallel on elements of the bijective-set memory, thereby avoiding the von Neumann bottleneck.

Another benefit of embodiments of the present invention over computers having a von Neumann architecture is that computers having a von Neumann architecture require operations to be performed iteratively over data in memory using operations known as "loops." Looping is inherently limited in speed because it requires performing operations sequentially, typically one operation per datum in memory. In contrast, embodiments of the present invention may operate in parallel (i.e., simultaneously) on some or all of the elements in the bijective-set memory 102. As a result, embodiments of the present invention avoid the need for iteration and therefore may be used to perform computations much more efficiently than computers having a von Neumann architecture.

Yet another benefit of embodiments of the present invention over computers having a von Neumann architecture is that memory cells in a von Neumann architecture are addressed by numbers (e.g., 1, 2, 3, etc.). In contrast, memory cells in the bijective-set memory 102 of embodiments of the present invention are addressed by their contents. The content of a memory cell in the bijective-set memory 102, in other words, is the address of that memory cell. As a result, memory cells in the bijective-set memory 102 of the present invention may be addressed directly by their contents, and thereby addressed more quickly than von Neumann architectures, which requires contents to be found by searching through memory cells. In other words, the content of each unit of data in the bijective set memory 102 serves as its own address.

Modern computers are constructed as DTMs. Embodiments of the present invention may construct NTMs from DTMs. Embodiments of the present invention, therefore, may be used to implement NTMs using existing modern computers, and therefore may be used to enable such computers to solve computational problems with significantly greater efficiency than is possible using existing techniques, but without necessarily requiring the construction of new computer hardware.

Embodiments of the present invention may be used to perform a wide variety of computations. For example, embodiments of the present invention may be used to perform sequence alignment of the type disclosed in the above-referenced U.S. Prov. Pat. App. Ser. No. 61/798,848, entitled, "Sequence Alignment." In particular, in this embodiment:

The input 106 is the set of strings to be aligned with each other.

The output 108 is the result of the alignment (e.g., intersection, difference).

The knowledge of the relationships among the strings is learned by the learning module 114 and stored in the bijective set memory 102.

Each time the strings are compared, the NTM 100 recognizes the intersections and differences between the strings, using 3-dimensional triplets as the basic elements of comparison.

The reduction module 118 searches the strings for similarity and differences. In particular, the reduction module 118 uses reduction to retrieve the relations (x,y), (y,z), and (z,x) for each triplet (x,y,z).

The deduction module 116 identifies, for each of the input strings, one or more "class strings" in the conceptual memory 112 to which the input strings correspond.

The structure of the sequences represented by the strings is represented in the 3-dimensional spatial binary system as three-dimensional relations.

As another example, embodiments of the present invention may be applied to relational databases as follows:

The input 106 is, for each table in the database, the table (including the table name), the data from each field of the table, the records of the table, the domain (attribute), and the relation(s) of the table to other tables in the database. Each unit of data belongs to one or more records as elements of the tuples. Each unit of data also belongs to one or more domains as elements of the attributes. Each attribute belongs to one or more tables.

The learning module 114 may learn the relations within the database, and store those relations in the bijective-set memory 102.

Each time a query is performed on the database, the NTM 100 need only retrieve the intersections of the query with the data in the database. For example, consider a query for retrieving which products customers bought if they also bought computers. In response to such a query, the NTM first retrieves the names of the customers from the intersection of the customer attribute and the customer name attribute using the reduction module 118. Then, the deduction module 116 retrieves the purchase records for these customers, indicating what other products those customers bought.

In summary, embodiments of the present invention may be used to construct an implementation of a non-deterministic Turing machine (NTM). More specifically, embodiments of the present invention may construct an NTM that includes an integration of a spatial binary enumeration method, a three-dimensional relation method, a bijective-set method, and a simulated human logic method. Embodiments of the present invention may construct such methods from a conventional (deterministic) Turing machine. More specifically, embodiments of the present invention provide a programmable data structure to simulate the bijective-set using a deterministic Turing machine, and provide a logic program in a deterministic Turing machine to simulate the bijective-set operations.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

The invention claimed is:

1. A computer implementing a nondeterministic Turing machine, the nondeterministic Turing machine comprising:
   a knowledgebase containing data representing a plurality of objects, data representing a plurality of classes, and data representing relationships between the plurality of objects and the plurality of classes;
   an induction module comprising means for generating data representing a concept represented by a plurality of inputs representing a plurality of objects and for storing the data representing the concept in the knowledgebase;
   a deduction module for retrieving, from the knowledgebase, data representing a class containing an object represented by an input to the deduction module;
   a reduction module for retrieving, from the knowledgebase, data representing an object which is a member of a class represented by an input to the reduction module;
   wherein the data representing the plurality of objects represent the plurality of objects in the form of three-dimensional representations of a first plurality of spatial binary numbers; and
   wherein the data representing the plurality of classes represent the plurality of classes in the form of three-dimensional representations of a second plurality of spatial binary numbers;
   wherein the plurality of inputs and a current state of the nondeterministic Turing machine does not determine at least one of: (1) the data representing the class, and (2) the data representing the object;
   wherein each of the first and second pluralities of spatial binary numbers has a value selected from the set consisting of −1 and +1.

2. The device of claim 1, further comprising:
   a cognitive logic unit comprising means for receiving an input and for triggering the induction module to perform induction on the input and on data stored in the knowledgebase to generate a representation of a class containing an object represented by the input.

3. The device of claim 1, further comprising:
   a cognitive logic unit comprising means for receiving an input and for triggering the deduction module to perform deduction on the input and on data stored in the knowledgebase to retrieve, from the knowledgebase, data representing a class containing an object represented by the input.

4. The device of claim 1, further comprising:
   a cognitive logic unit comprising means for receiving an input and for triggering the reduction module to perform deduction on the input and on data stored in the knowledgebase to retrieve, from the knowledgebase, data representing an object which is a member of a class represented by the input.

5. The device of claim 1, wherein the deduction module comprises means for retrieving the data representing the class by performing a set operation on data in the knowledgebase.

6. The device of claim 1, wherein the reduction module comprises means for retrieving the data representing the object by performing a set operation on data in the knowledgebase.

7. A method for use with a computer implementing a nondeterministic Turing machine, the nondeterministic Turing machine including a knowledgebase, wherein the knowledgebase contains data representing a plurality of objects, data representing a plurality of classes, and data representing relationships between the plurality of objects and the plurality of classes, wherein the method comprises:
   generating data representing a concept represented by a plurality of inputs representing a plurality of objects and for storing the data representing the concept in the knowledgebase;
   retrieving, from the knowledgebase, data representing a class containing an object represented by an input to the deduction module;
   retrieving, from the knowledgebase, data representing an object which is a member of a class represented by an input to the reduction module;
   wherein the data representing the plurality of objects represent the plurality of objects in the form of three-dimensional representations of a first plurality of spatial binary numbers; and
   wherein the data representing the plurality of classes represent the plurality of classes in the form of three-dimensional representations of a second plurality of spatial binary numbers;
   wherein the plurality of inputs and a current state of the nondeterministic Turing machine does not determine at least one of: (1) the data representing the class, and (2) the data representing the object;
   wherein each of the first and second pluralities of spatial binary numbers has a value selected from the set consisting of −1 and +1.

8. The method of claim 7, further comprising:
   receiving an input and for triggering the induction module to perform induction on the input and on data stored in the knowledgebase to generate a representation of a class containing an object represented by the input.

9. The method of claim 7, further comprising:
   receiving an input and for triggering the deduction module to perform deduction on the input and on data stored in the knowledgebase to retrieve, from the knowledgebase, data representing a class containing an object represented by the input.

10. The method of claim 7, further comprising:
    receiving an input and for triggering the reduction module to perform deduction on the input and on data stored in the knowledgebase to retrieve, from the knowledgebase, data representing an object which is a member of a class represented by the input.

11. The method of claim 7, wherein retrieving the data representing the class comprises performing a set operation on data in the knowledgebase.

12. The method of claim 7, wherein retrieving the data representing the object comprises performing a set operation on data in the knowledgebase.

* * * * *